G. FRITZ.
SAW GAGE.
APPLICATION FILED MAY 21, 1912.
1,048,403.
Patented Dec. 24, 1912.
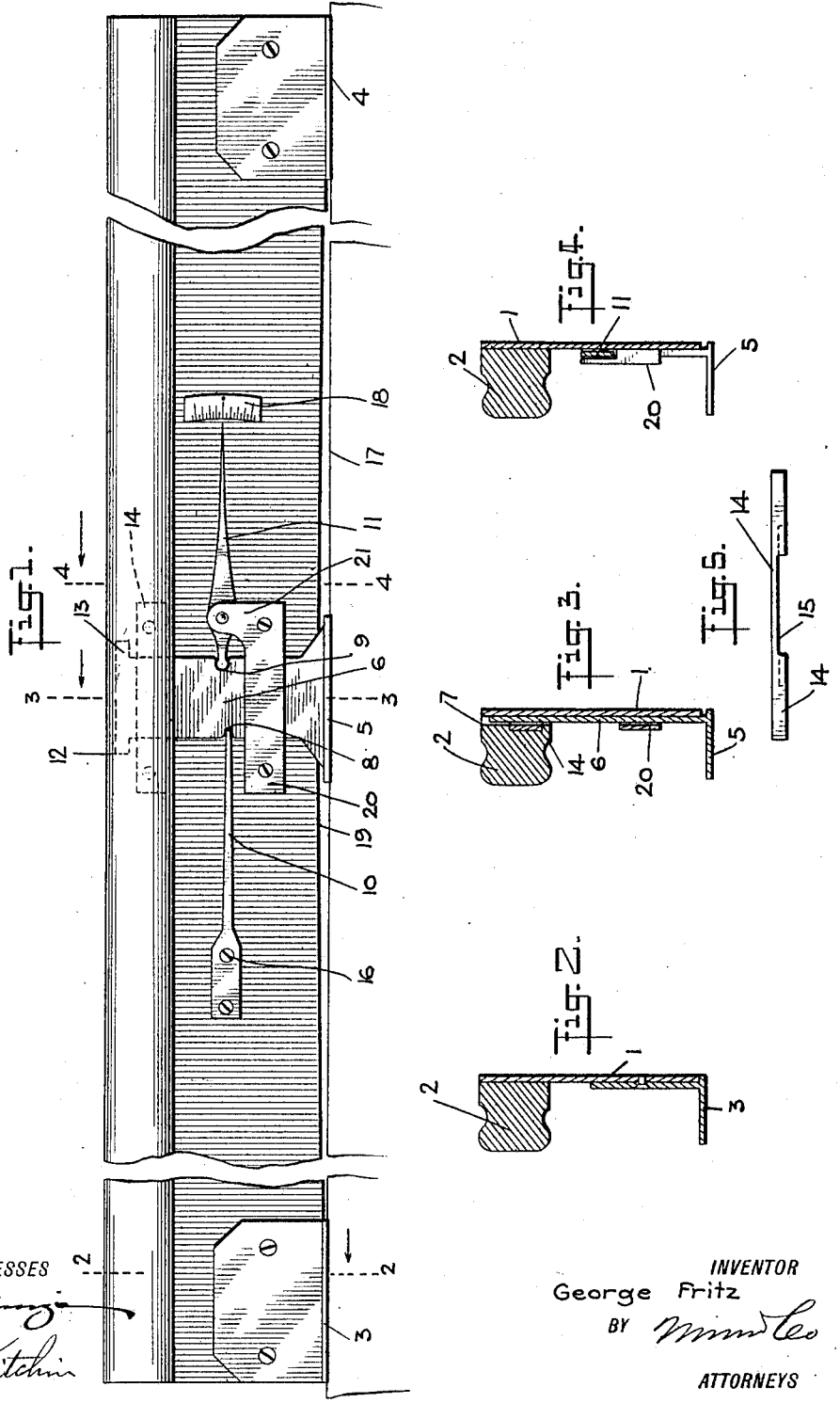
WITNESSES
INVENTOR
George Fritz
BY
ATTORNEYS

UNITED STATES PATENT OFFICE.

GEORGE FRITZ, OF PARK FALLS, WISCONSIN.

SAW-GAGE.

1,048,403.  Specification of Letters Patent.  Patented Dec. 24, 1912.

Application filed May 21, 1912. Serial No. 698,691.

*To all whom it may concern:*

Be it known that I, GEORGE FRITZ, a citizen of the United States, and a resident of Park Falls, in the county of Price and State of Wisconsin, have invented a new and Improved Saw-Gage, of which the following is a full, clear, and exact description.

This invention relates to saw gages, and has for an object to provide an improved structure which will automatically indicate the bend or curvature of a saw applied thereto.

A further object of the invention is to provide an improved gage for saws designed to indicate on a scale the amount of curvature of the saw, the action of the gage being automatic upon placing the gage tightly against the saw or other surface being gaged.

In carrying out the objects of the invention, a support is provided having a centrally movable member designed to be resiliently held in an outer position. Connected to this member is a pivotally mounted arm or pointer arranged to move over a graduated scale whereby when the holder or support is placed upon a surface the motion will be transmitted to the pointer for indicating the degree of curvature of the surface to which the gage has been applied.

A practical embodiment of the invention is represented in the accompanying drawings forming a part of this specification in which similar characters of reference indicate corresponding parts in all the views.

Figure 1 is a side view of an embodiment of the invention; Fig. 2 is a section through Fig. 1 on the line 2—2; Fig. 3 is a section through Fig. 1 on the line 3—3; Fig. 4 is a section through Fig. 1 on the line 4—4; and Fig. 5 is a top plan view of a stop embodying certain features of the invention.

Referring to the accompanying drawings by numerals, 1 indicates a supporting plate, and 2 a grip or hand rail which is rigidly secured to the plate 1. The plate 1 carries at its ends stops or feet 3, and 4. Arranged centrally of the plate 1 is a reciprocating foot 5 formed with an extension 6 projecting through an aperature 7 formed in the rail or hand-hold 2. The extension 6 is formed with apertures 8 and 9 for accommodating a spring 10 and a pointer 11 respectively. At the upper end the extension 6 is formed with shoulders 12 and 13 for engaging the upper edge of the stop 14, a slot 15 being formed in the stop 14 for accommodating the extension 6. The spring 10 is rigidly secured at 16 to the plate 1 and tends continually to force the foot 5 downward or in a direction away from the rail 2. When the gage has been placed upon the back of a saw 17, the same will move the foot 5 and extension connected therewith toward the rail 2 until the feet 3 and 4 engage the saw. If the back of the saw 17 is perfectly straight this movement will cause the pointer 11 to come opposite zero on the scale 18. If the back of the saw 17 is bulged the pointer 11 will move past zero to a correct position for indicating the amount of bulge or bend. If the back of the saw 17 is concaved the upward movement of the foot 5 will not be sufficient to move the pointer 11 to zero and will consequently indicate the amount of concavity of the back of the saw. In this way the condition of the back of the saw may be instantly ascertained by merely placing the gage firmly against the back of the saw. In the drawings the bottom edge 19 of the plate 1 has been shown as beveled or inclined upwardly from the ends toward the center. This is to permit the foot 5 to move upwardly or toward the rail 2 past a line drawn from the bottom of the foot 3 to the bottom of the foot 4 so as to indicate the bulge or outward bowing of the back of the saw 17.

The reciprocating stop 5 is arranged to be guided by a plate 20 secured to the plate 1 and by plate 14, together with the other members surrounding the opening 7. The plate 20 is provided with a turned up portion 21 in which the pointer 11 is pivotally mounted so that upon a back and forth movement of the stop 5 the pointer 11 will be moved pivotally.

The gage has been described particularly in respect to saws, but it will be evident that the same may be used for gaging other surfaces and for clearly indicating the amount of curvature of any particular surface.

Having thus described my invention I claim as new and desire to secure by Letters Patent:—

In a device of the character described, a body portion, a rigidly positioned stop on the end of said body portion, a reciprocating stop arranged centrally of the body portion, said reciprocating stop being formed with a pair of notches in opposite sides thereof, a pivotally mounted finger having one end loosely mounted in one of said notches whereby when said reciprocating stop is moved longitudinally said finger will be moved pivotally, a scale arranged near the free end of said finger for indicating the amount of movement of said reciprocating stop, and a spring secured at one end to said supporting body and having its opposite end arranged in one of the notches in said reciprocating stop whereby the reciprocating stop is caused to normally remain in one of its extreme positions.

In testimony whereof I have signed my name to this specification in the presence of two subscribing witnesses.

GEORGE FRITZ.

Witnesses:
MEDA KENNEY,
E. H. SEMERAN.

Copies of this patent may be obtained for five cents each, by addressing the "Commissioner of Patents, Washington, D. C."